United States Patent
Fukaya et al.

(10) Patent No.: US 11,360,112 B2
(45) Date of Patent: Jun. 14, 2022

(54) AUTOMATIC ANALYZER (71) Applicant: HITACHI HIGH-TECHNOLOGIES CORPORATION, Tokyo (JP)

(72) Inventors: Masashi Fukaya, Tokyo (JP); Eiichiro Takada, Tokyo (JP); Takuya Takahashi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 177 days.

(21) Appl. No.: 16/330,423

(22) PCT Filed: Aug. 4, 2017

(86) PCT No.: PCT/JP2017/028358
§ 371 (c)(1),
(2) Date: Mar. 5, 2019

(87) PCT Pub. No.: WO2018/055928
PCT Pub. Date: Mar. 29, 2018

(65) Prior Publication Data
US 2020/0225256 A1 Jul. 16, 2020

(30) Foreign Application Priority Data
Sep. 21, 2016 (JP) .............................. JP2016-183625

(51) Int. Cl.
*G01N 35/10* (2006.01)
(52) U.S. Cl.
CPC ..... *G01N 35/1004* (2013.01); *G01N 35/1016* (2013.01)
(58) Field of Classification Search
CPC ........... G01N 35/1004; G01N 35/1016; G01N 3/1004
(Continued)

(56) References Cited

U.S. PATENT DOCUMENTS

2008/0241939 A1* 10/2008 Matsuo .............. G01N 35/1009
436/54
2011/0111506 A1 5/2011 Zuppiger
(Continued)

FOREIGN PATENT DOCUMENTS

CN 102112882 A 6/2011
GB 2 068 115 A 8/1981
(Continued)

OTHER PUBLICATIONS

International Search Report of PCT/JP2017/028358 dated Oct. 31, 2017.
(Continued)

*Primary Examiner* — Robert R Raevis
(74) *Attorney, Agent, or Firm* — Mattingly & Malur, PC (57) ABSTRACT

A cleaning water flow velocity during nozzle cleaning is momentarily changed by using a pressure changing mechanism, for example, a syringe. That is, after the start of cleaning, a solenoid valve is opened, and an aspirating operation of the syringe is momentarily performed by a fixed amount in a state where a flow of cleaning water in a nozzle is developed, whereby a nozzle flow velocity is momentarily decelerated. Immediately thereafter, the syringe is pushed back to a home position again, and the flow velocity in the nozzle is accelerated again. A cleaning effect can be improved by performing transition of velocity distribution to various states. Flow velocity control by the pressure changing mechanism can be realized without inhibiting a dispensing cycle, and the cleaning effect of the nozzle can be improved without changing the pressure of a liquid feeding pump or extending the cleaning time.

1 Claim, 10 Drawing Sheets

1. REAGENT DISPENSING NOZZLE
2. TUBE
3. CONNECTING PART
4. SYRINGE
5. SOLENOID VALVE
6. LIQUID FEEDING PUMP
7. PLUNGER
8. MOTOR
9. REAGENT BOTTLE
10. REACTION CONTAINER
11. NOZZLE CLEANING MECHANISM
12. COVER (58) Field of Classification Search
USPC .... 73/61.59, 864.21–864.25; 422/62–65, 81; 134/22.12, 169 C
See application file for complete search history.

(56) References Cited

U.S. PATENT DOCUMENTS

2011/0171069 A1   7/2011  Mishima et al.
2014/0255254 A1*  9/2014  Yamaguchi ........ G01N 33/4905
                                                                  422/73

FOREIGN PATENT DOCUMENTS

| JP | 6-229892 A | 8/1994 |
| JP | 10-96735 A | 4/1998 |
| JP | 10-104240 A | 4/1998 |
| JP | 2003-294773 A | 10/2003 |
| JP | 2011-033420 A | 2/2011 |

OTHER PUBLICATIONS

Extended European Search Report received in corresponding European Application No. 17852709.9 dated May 8, 2020.
Japanese Office Action received in corresponding Japanese Application No. 2018-540677 dated Dec. 8, 2020.
Chinese Office Action received in corresponding Chinese Application No. 201780056408.2 dated Jan. 13, 2022.
Communication Pursuant to Article 94(3) EPC received in corresponding European Application No. 17852709.9 dated Feb. 23, 2022.

* cited by examiner

AUTOMATIC ANALYZER

TECHNICAL FIELD

The present invention relates to an automatic analyzer that measures concentration or an activity value of a target component in a biological sample including multiple components such as blood and urine, and more particularly to an automatic analyzer that includes a dispensing mechanism including a nozzle for aspirating a liquid such as a sample and a reagent and a cleaning mechanism for cleaning the inside of the nozzle.

BACKGROUND ART

An automatic analyzer is a device for analyzing a biological sample such as blood, urine, cerebrospinal fluid, and the like. The automatic analyzer has a function of dispensing a sample and a reagent from each of the storage containers into a reaction container by using a dispensing mechanism provided in nozzles for the sample and the reagent, measuring a color tone change of a reacted liquid by a photometer after stirring a mixed liquid of the sample and the reagent, and outputting a result thereof by quantitatively determining a target substance in the sample from the measured data. In the automatic analyzer, when the nozzles of the sample and the reagent repeatedly perform the above-described dispensing operation, a nozzle inner wall and a nozzle outer wall are cleaned in preparation for the next dispensing operation after discharging the target sample and reagent to the reaction container to avoid carry-over between the sample and the reagent.

When cleaning the inner wall of the dispensing nozzle, it is common to clean away a specimen or the reagent remaining in a dispensing nozzle by flowing out cleaning water from a pipe connected to the dispensing nozzle. Further, when cleaning the outer wall of the dispensing nozzle, the cleaning water is discharged from a cleaning nozzle disposed around the dispensing nozzle, thereby cleaning away the specimen or the reagent. It is possible to easily clean the inside of the nozzle by using the same pipe for the transfer of the liquid at the time of dispensing the specimen and the reagent and a flow path of the liquid at the time of cleaning the inner wall.

At the time of the dispensing operation, since the nozzle inner wall has a wider contamination range during aspiration than that of the nozzle outer wall, cleaning efficiency of the nozzle inner wall greatly affects a carry-over amount. The carry-over of the sample and the reagent should be designed to be within a range where there exists no clinical problem. In recent years, the automatic analyzer is required to reduce the liquid volume and to handle various kinds of samples and reagents to cope with various inspection items. Further, speed and accuracy of the inspection are required at an inspection center handling large amounts of specimens and a hospital with large numbers of patients. Carry-over reduction of the device is an essential factor for achieving the above-described requirements.

CITATION LIST

Patent Literature

PTL 1: JP-A-2011-33420

SUMMARY OF INVENTION

Technical Problem

In an automatic analyzer, a nozzle for dispensing a sample and a reagent should perform cleaning to such an extent that a carry-over amount can be reduced up to a range where a clinical problem does not exist for each dispensing operation. In order to achieve high processing capability in the automatic analyzer, time for each one cycle of each dispensing operation tends to be shortened, and accordingly cleaning time that can be set is also shortened. The automatic analyzer is required to obtain an efficient cleaning effect to secure analysis performance within a determined time.

The nozzle used in the automatic analyzer is a tubular shape, and the inside of the nozzle is cleaned by allowing a cleaning liquid fed from a liquid feeding pump, for example, normal ion-exchanged water to pass through the inside thereof. In order to improve the cleaning effect of the inner wall of the nozzle, for example, as disclosed in PTL 1, a method for increasing a flow velocity at the time of cleaning by using a liquid feeding flow path dedicated for the cleaning is adopted. However, from the perspective of a load on the device and the pump and an amount of water consumed, an amount of the cleaning liquid fed out by the liquid feeding pump is limited. Further, the nozzle used for the automatic analyzer uses a nozzle which has a complicated change in a flow path shape in the nozzle such as a throttle, a curvature, a connecting part with a tube, and the like according to a configuration of a dispensing mechanism. In a portion where the nozzle shape changes, there exists a portion where dirt is easy to locally remain due to deviation of the flow velocity that generates swirling, stagnation, and the like of the flow of the cleaning liquid. The deviation of the flow cannot be eliminated only by increasing the flow velocity by increasing the amount of liquid to be fed, and there exists a limit to the improvement of the cleaning effect. It is required to eliminate the deviation of the flow velocity to perform the efficient cleaning.

An object of the present invention is to provide an automatic analyzer that includes a means for efficiently eliminating dirt on an inner wall of a nozzle while having limitation to the pressure of a liquid feeding pump and limitation to the cleaning time.

Solution to Problem

A configuration of the present invention for solving the above-mentioned problem will be described as follows.

Provided is an automatic analyzer, including: a sample nozzle dispensing a sample into a reaction container; a reagent nozzle dispensing a reagent into the reaction container; a reaction disk including the reaction container for mixing the sample and the reagent; a pressure changing mechanism changing pressure in either one of the sample nozzle and the reagent nozzle; a liquid feeding mechanism feeding a cleaning liquid to the nozzle; a pipe connecting the nozzle, the pressure changing mechanism, and the liquid feeding mechanism; and a controller which controls the pressure changing mechanism and the liquid feeding mechanism, wherein the controller cleans the inside of the nozzle by feeding the cleaning liquid from the liquid feeding mechanism into the nozzle, and the controller decelerates a flow velocity of the cleaning liquid fed from the liquid feeding mechanism by controlling the pressure changing mechanism at the time of cleaning the inside of the nozzle.

Advantageous Effects of Invention

According to the present invention, it is possible to improve cleaning capability without changing pressure setting of a liquid feeding mechanism such as a liquid feeding pump of a cleaning liquid, and the like without lowering the throughput of a device.

DESCRIPTION OF EMBODIMENTS

Hereinafter, an automatic analyzer to which the present invention is applied will be described.

Figure 10:
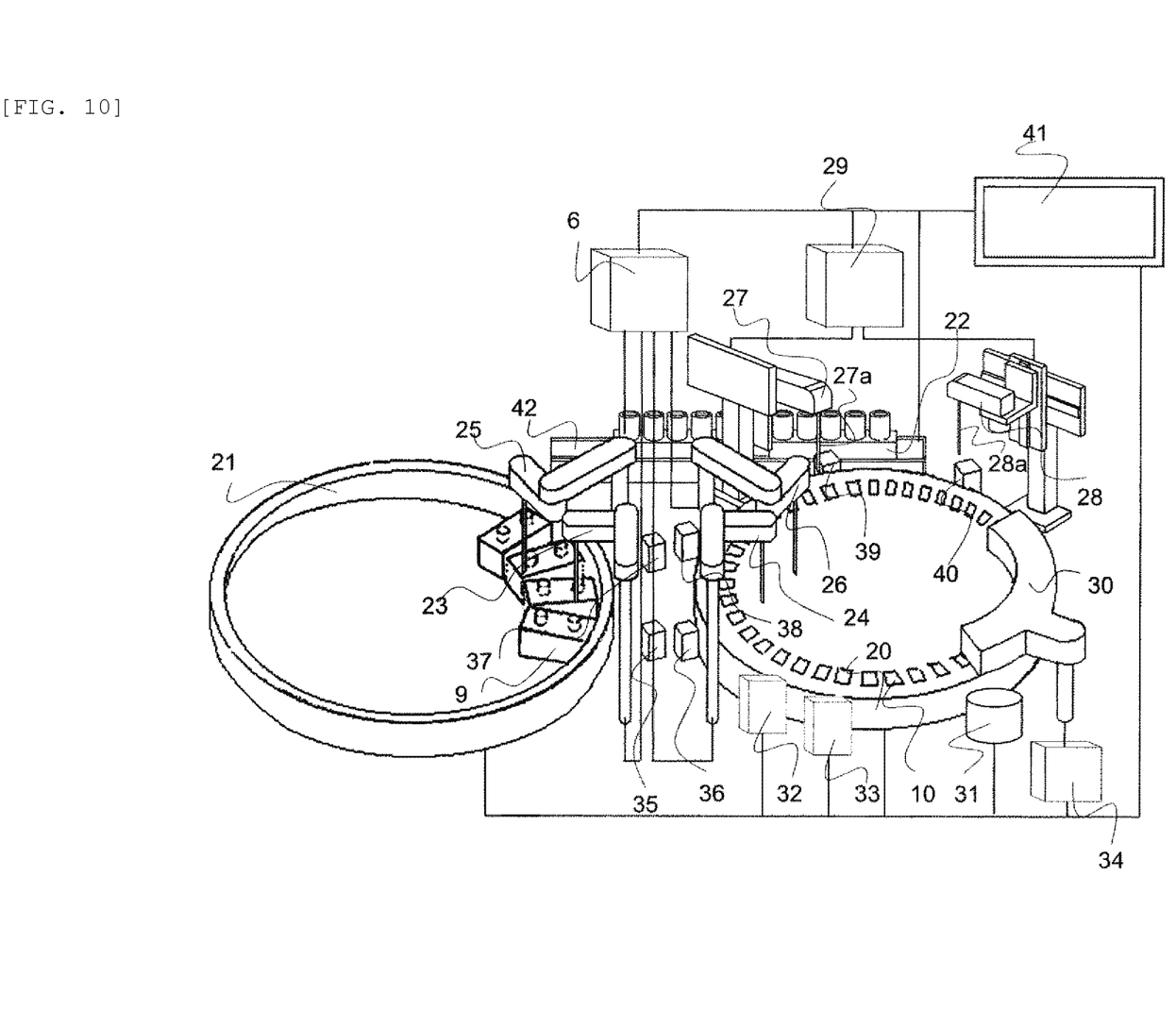
FIG. 10 is a schematic configuration diagram of an automatic analyzer.

FIG. 10 is a schematic configuration diagram of an automatic analyzer to which the present invention is applied. In FIG. 10, a reaction container 10 is circumferentially disposed in a reaction disk 20. A plurality of reagent bottles 9 can be disposed on a circumference in a reagent disk 21. A sample conveying mechanism 42 that moves a rack 22 on which a sample container is placed is installed between the reaction disk 20 and the reagent disk 21. Further, reagent dispensing mechanisms 23, 24, 25, and 26 are installed between the reaction disk 20 and the reagent disk 21. Further, sample dispensing mechanisms 27 and 28 capable of rotating, horizontally moving, and vertically moving are installed between the reaction disk 20 and the sample conveying mechanism 42, and the sample dispensing mechanisms 27 and 28 are provided with sample dispensing nozzles (abbreviated as a sample nozzle) 27a and 28a. A sample pump 29 is connected to the sample nozzles 27a and 28a. The sample nozzles 27a and 28a perform a rotation operation centering on a rotation axis and a horizontal operation moving on a horizontal moving rail, thereby performing sample dispensing from the sample container to the reaction container 10.

A cleaning mechanism 30, a spectrophotometer 31, stirring mechanisms 32 and 33, the reagent disk 21, and the sample conveying mechanism 42 are disposed around the reaction disk 20, and a cleaning pump 34 is connected to the cleaning mechanism 30. Nozzle cleaning mechanisms (cleaning tanks) 35, 36, 37, 38, and 40 are respectively installed in operation ranges of the reagent dispensing mechanisms 23, 24, 25, and 26, the sample dispensing mechanisms 27 and 28, and the stirring mechanisms 32 and 33. A liquid feeding pump 6 for the reagent is connected to the reagent dispensing mechanisms 23, 24, 25, and 26.

The sample container includes an inspection sample such as blood and urine, and is placed on the rack 22 and is conveyed by the sample conveying mechanism 42. Further, each mechanism is connected to a controller 41, and an operation thereof is controlled by the controller 41. Further, the controller 41 has a function as an analysis unit for analyzing the inspection sample in the reaction container 10.

Next, an analysis operation will be described. The sample dispensing mechanism 27 aspirates the sample from the sample container of the rack 22 with the sample nozzle 27a and discharges the aspirated sample to the reaction container 10. Further, the reagent dispensing mechanism 23 aspirates the reagent from the reagent bottle 9 with the reagent nozzle and discharges the aspirated reagent to the reaction container 10. The sample and the reagent dispensed into the same reaction container are mixed with each other, and the mixed liquid is photometrically measured by the spectrophotometer. The reaction disk 20 performs a rotation and a stop in one cycle (for example, 3.6 seconds), and every time the reaction container which is an object to be measured passes a front of the spectrophotometer, photometry is periodically performed. The controller 41 calculates concentration or an active value of the target component in the sample based upon a photometric result of the spectrophotometer after the lapse of a fixed time. This is the way the analysis is performed.

Next, nozzle cleaning will be described. The reagent dispensing mechanism 23 dispenses the reagent from the reagent bottle to the reaction container 10 by using the reagent nozzle once within one cycle (3.6 seconds), and repeats this dispensing operation. Since there is a possibility of dispensing a different reagent after dispensing, the reagent nozzle is cleaned by stopping at the cleaning tank 35. In other words, the reagent nozzle repeats reagent aspiration, reagent discharge, nozzle cleaning, and the reagent aspiration in order, and is driven as one cycle from the reagent aspiration to the next reagent aspiration. Further in the same manner, the sample nozzle repeats sample aspiration, sample discharge, nozzle cleaning, and the sample aspiration in order, and is driven as one cycle from the sample aspiration to the next sample aspiration.

Figure 1:
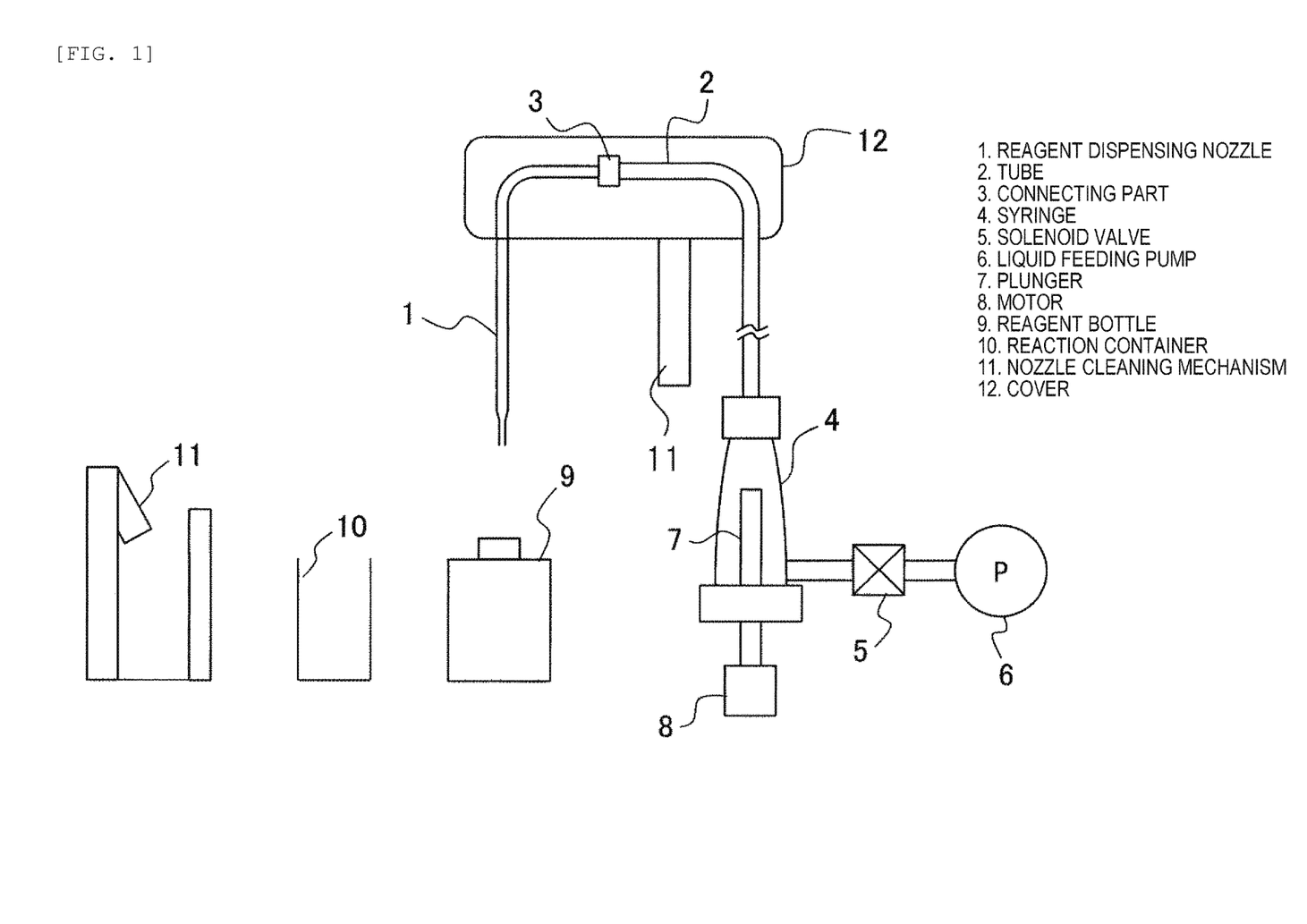
FIG. 1 is a schematic diagram of a reagent dispensing mechanism.

FIG. 1 is a schematic diagram centering on a flow path of the dispensing mechanism of the automatic analyzer used in the present invention. Even though there exist the dispensing mechanism of the automatic analyzer for the sample and the dispensing mechanism of the automatic analyzer for the reagent, since configurations of both thereof according to the present invention are similar to each other, FIG. 1 schematically illustrates the reagent dispensing mechanism as an example of the dispensing mechanism.

The reagent dispensing mechanism is provided with a reagent dispensing nozzle 1, and the reagent dispensing nozzle 1 is connected to a tube 2 for drawing a flow path into a device through a cover 12 of a nozzle arm via a connecting part 3. The tube 2 forms a flow path connected to the liquid feeding pump 6, which is a liquid feeding mechanism, via a syringe 4 and a solenoid valve 5 from a nozzle connecting direction. The plunger 7 of the syringe is driven by a connected motor 8. When dispensing a target reagent, the dispensing mechanism maintains the solenoid valve 5 in a closed state, and after the mechanism moves to a reagent installation unit, it is confirmed that the reagent dispensing nozzle 1 reaches a reagent liquid level in the reagent bottle 9, after which the plunger 7 is operated in an aspirating direction, and the reagent is drawn into the reagent dispensing nozzle 1, after which the reagent dispensing nozzle 1 moves to a predetermined discharging position, for example, the reaction container 10, the plunger 7 is moved in a discharging direction to discharge the reagent. After the discharge is completed, the dispensing mechanism moves the reagent dispensing nozzle 1 to a position of a nozzle cleaning mechanism 11 and performs a cleaning operation. The cleaning operation is performed in such a manner that the solenoid valve 5 is open, the pressure of the liquid feeding pump is transmitted, cleaning water flows through the flow path, and then the cleaning water is discharged from a tip of the reagent dispensing nozzle.

Here, the liquid feeding pump 6 includes a function of feeding the cleaning water to the reagent dispensing nozzle 1, and is a liquid feeding mechanism that feeds the cleaning water from a cleaning water tank disposed upstream of the liquid feeding pump 6. Further, the syringe 4 provided with the plunger 7 is a pressure changing mechanism that changes the pressure in the nozzle. Further, the tube 2 is a pipe that connects the reagent dispensing nozzle 1, the syringe 4, and the liquid feeding pump 6. Further, the controller 41 can control the solenoid valve 5, the liquid feeding pump 6, the motor 8 of the plunger, and the like. Further, hereinafter, there is a case where control of the syringe is simply referred to as control of the plunger, but the control of the syringe means the control of the motor 8 of the plunger 7.

Figure 2:
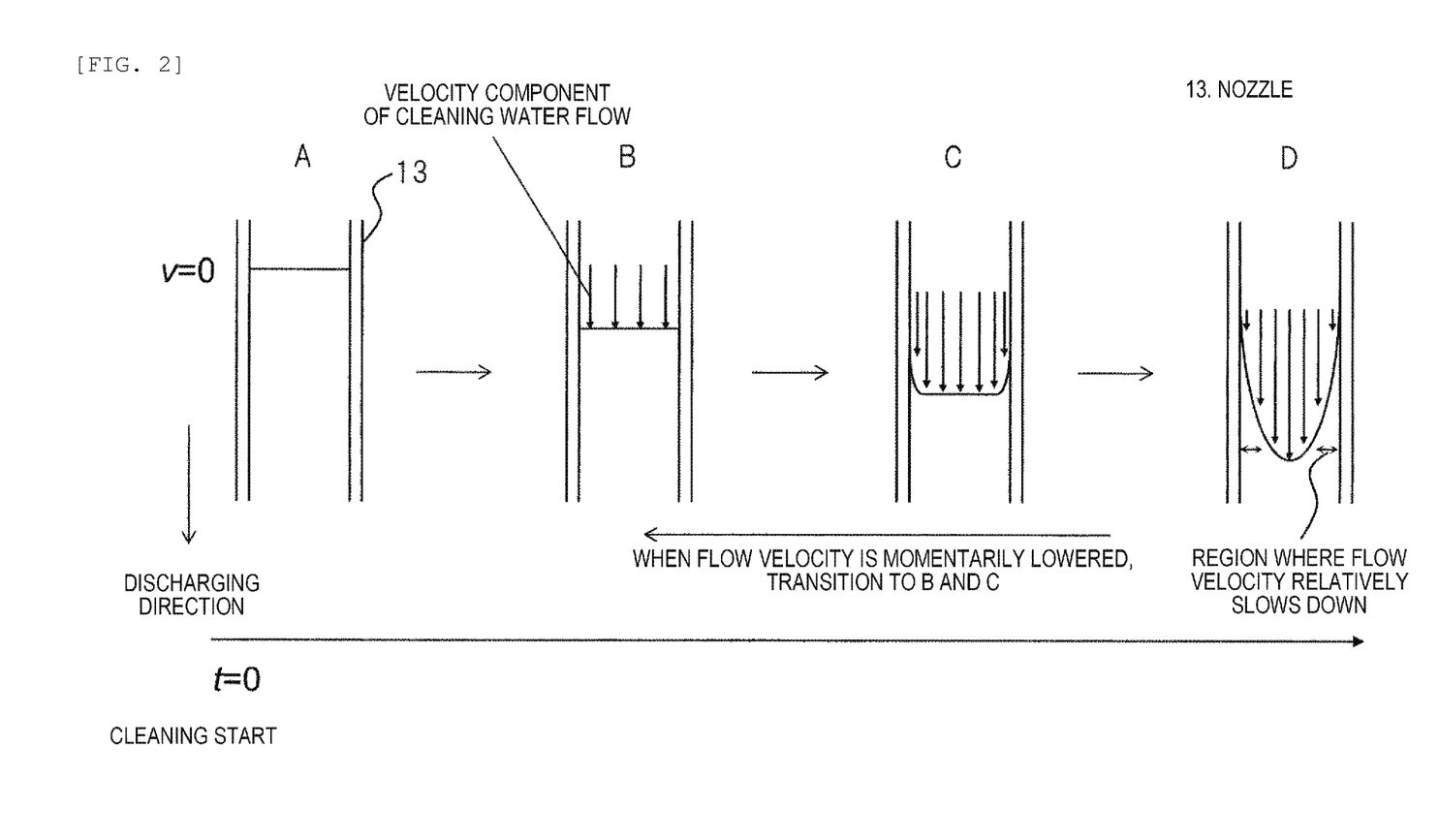
FIG. 2 is a schematic diagram of a change in velocity distribution caused by a time change in cleaning water in a nozzle.

FIG. 2 schematically illustrates a time change in average flow velocity distribution inside a nozzle wall surface 13 during the cleaning operation. A state where a flow velocity v does not exist when the solenoid valve is not opened is illustrated in A of FIG. 2. Immediately after the solenoid valve is opened and the liquid feeding is started by the pressure of the liquid feeding pump (t=0), the cleaning water flowing through the inside of the nozzle 13 starts to flow in a moving direction at a constant velocity (B of FIG. 2). Form the above-mentioned state, an influence of friction, and the like with an inner wall is gradually received, and as a position is closer to the wall surface, the velocity becomes lower, and as the position is closer to a center, the velocity becomes faster (C of FIG. 2). Even though the above-mentioned tendency becomes further large with the lapse of time, a shape of the average flow velocity distribution becomes constant when the flow is sufficiently developed (D of FIG. 2).

Generally, since as the flow velocity is faster, a cleaning effect is higher, an average cleaning power per unit time of the whole nozzle 13 is the highest in a state D of FIG. 2. However, when locally looking at the vicinity of the wall surface of the nozzle 13, in D of FIG. 2, a regain where the flow velocity decreases in the vicinity of the inner wall of the nozzle 13 exist in a wide range, whereas in the states B and C of FIG. 2, the flow velocity in the vicinity of the wall surface can be relatively secured. Since velocity gradient of the flow velocity in the vicinity of the wall surface is large in the states B and C of FIG. 2, power for scraping off dirt being stuck to the wall surface is strong, thereby making it possible to efficiently peel off the dirt stuck thereto. Further, in the case of a steady flow at the constant velocity, since the flow velocity is slow in the vicinity of the wall surface, it takes time until the dirt is discharged to the outside of the flow path, however, a dirt component contained in the liquid in the vicinity of the wall surface can be discharged to the outside of the flow path in a short time by transiently increasing the flow velocity in the vicinity of the wall surface by imparting velocity fluctuation. That is, with respect to the nozzle cleaning, it is important not only to simply perform the cleaning with high-velocity flowing water, but also to provide an efficient component for the cleaning of a pipe wall such as the states B and C in FIG. 2.

Figure 3:
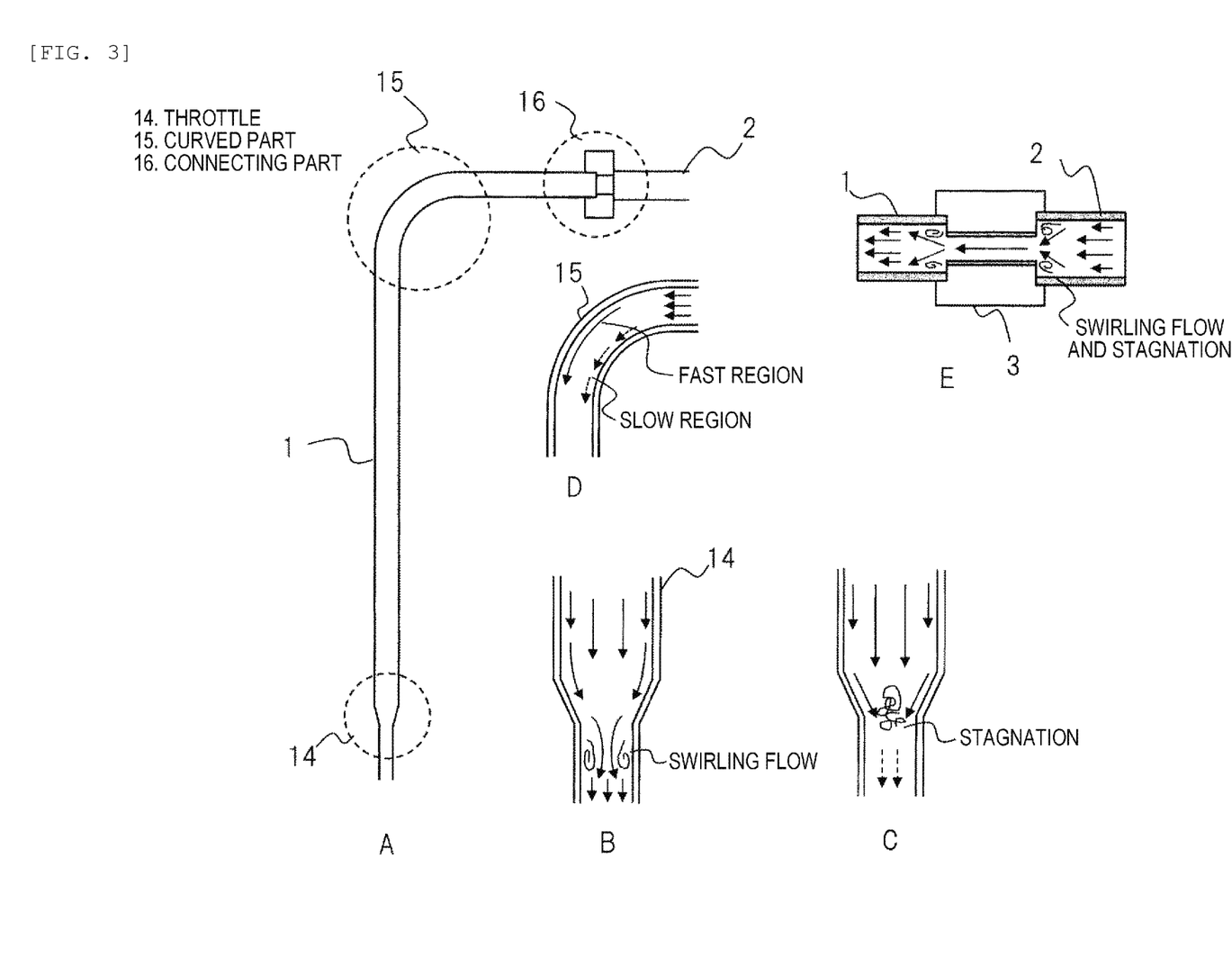
FIG. 3 is a schematic diagram of a reagent nozzle shape and flow velocity distribution.

A of FIG. 3 illustrates an example of a nozzle shape of the automatic analyzer. Since the automatic analyzer should secure a width of dispensing amount setting, a throttle 14 is often provided at a tip of the nozzle. A nozzle volume at the time of aspiration can be secured while securing discharge accuracy at the time of dispensing by providing the throttle 14. Further, a curved part 15 for storing the nozzle in the mechanism, a connecting part 16 that is connected to the tube for drawing the flow path into the device, and the like are provided. A of FIG. 3 only illustrates an example of the nozzle shape, the nozzle shape also includes various shapes and modifications such as twisting, and the like in addition to the throttle, the curvature, and the connecting part, and the present invention is also effective with respect to such a shape.

Generally, as the flow velocity is faster, the cleaning effect is higher; however, as illustrated in B of FIG. 3, a swirling flow caused by a contraction flow is generated at a portion where the throttle 14 exists. Further, since the flow advances along the throttle as illustrated in C of FIG. 3, when the flow velocity is fast, the flows collide with each other at a portion where a diameter is reduced and thus stagnation may also occur. Further, since a vector of the flow rapidly changes at a curved part as illustrated in D of FIG. 3, the cleaning effect is relatively lowered on the inside of the curved part while the cleaning effect is high on the outside of the curved part due to an influence of centrifugal force, and the like.

E of FIG. 3 illustrates an example of a cross section of the nozzle and the tube connecting part. The nozzle and the tube are connected to each other by a connecting component such as a resin, and the like, however, a change of a flow path shape occurs between the respective components when diameters of the respective components are different from each other and due to tolerances of the respective components. In this case, a more complicated swirling flow and stagnation occur.

One of the causes of generating the carry-over is that the dirt on the inside of the nozzle is not smoothly discharged due to the swirling flow and the stagnation illustrated in B, C, D, and E in FIG. 3.

In the present invention, provided are a method of improving the cleaning efficiency by using the change in the flow velocity distribution caused by the time transition of the cleaning water in the nozzle as illustrated in FIG. 2; and an effective cleaning method for a portion where the nozzle shape changes as illustrated in FIG. 3.

It is possible not only to secure the average flow velocity of the nozzle wall surface, but also to momentarily improve the cleaning power with respect to the dirt stuck in the vicinity of the wall surface by, as described above, performing the transition to the states B and C of FIG. 2 specialized for the cleaning efficiency in the vicinity of the wall surface while forming a high cleaning power state of the whole nozzle illustrated in D of FIG. 2 during the cleaning time and having the timing of shifting again to the state D of FIG. 2 a plurality of times.

In order to perform the transition of the flow velocity distribution from the state D in FIG. 2 to the states B and C in FIG. 2, it is required to lower the flow velocity. On the other hand, when the time to lower the flow velocity takes too long, since the flow rate is reduced and the cleaning effect in the whole cleaning time cannot be sufficiently obtained, it is desirable that the transition to the states B and C in FIG. 2 takes a very short time. That is, in order to efficiently clean the nozzle inner wall, it is effective not only to do cleaning at the constant velocity, but also to momentarily decelerate the flow velocity.

As illustrated in FIG. 3, the above-mentioned flow velocity change is effective even at a portion where the nozzle shape changes and the flow shape of the flow changes. When the solenoid valve is opened and the cleaning water is pushed out only by the pressure of the liquid feeding pump, the flow velocity in the nozzle becomes approximately constant after the lapse of a fixed time. When the flow velocity is the constant velocity, the flow velocity is stabilized in a state where the swirling flow and the stagnation occur at specific portions as illustrated in B, C, D, and E of FIG. 3. When there is a possibility that the dirt is left behind in the stagnation and the swirling flow, in order to eliminate this flow, it is effective to disturb the velocity distribution in the nozzle flowing at the constant velocity. That is, it is effective to accelerate and decelerate the flow velocity in the nozzle.

Figure 4:
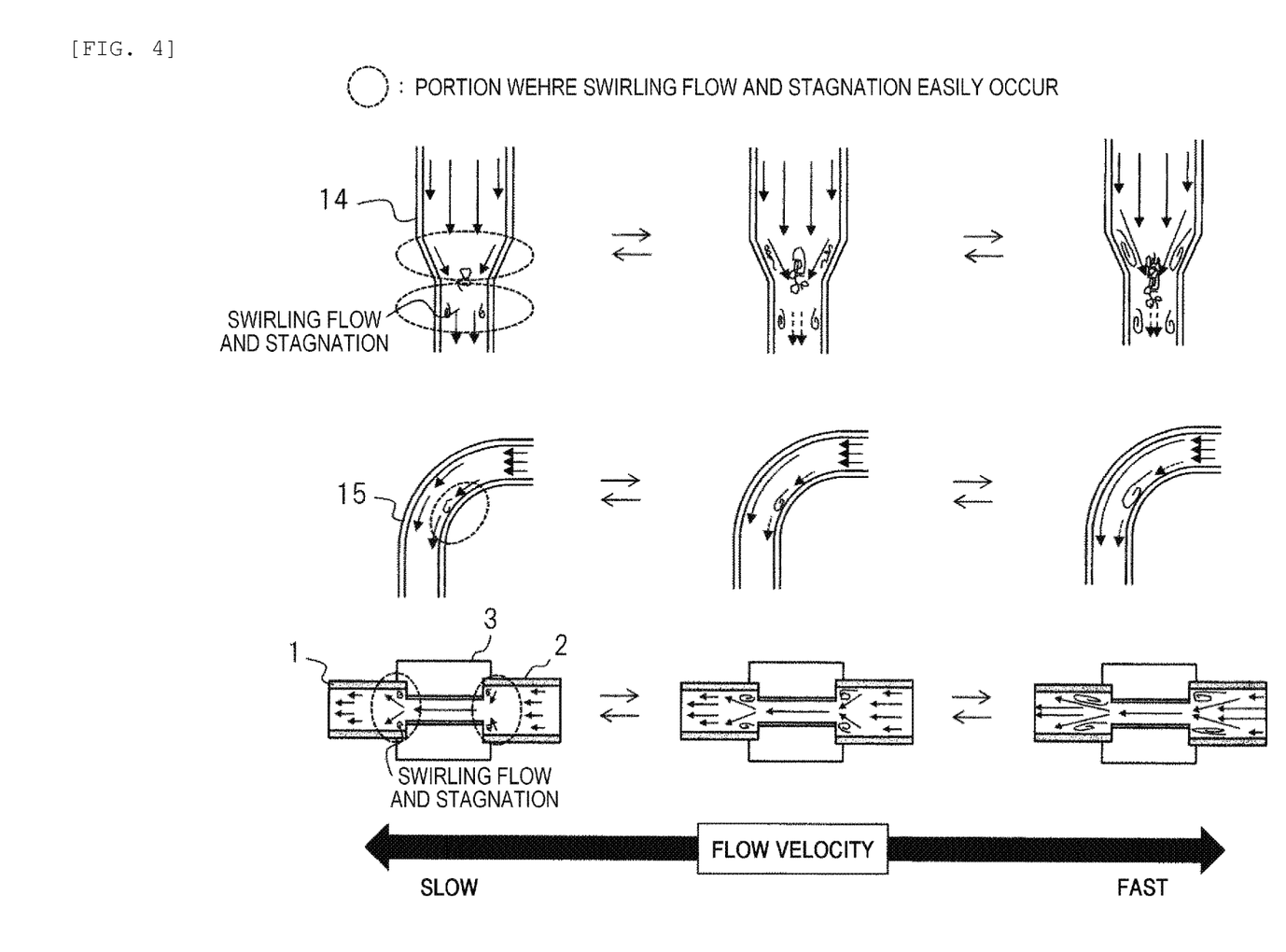
FIG. 4 is a schematic diagram of a change in cleaning water velocity distribution caused by a change in a flow velocity of a specific portion of the nozzle.

FIG. 4 illustrates an image when the flow velocity changes at a portion in FIG. 3. Since a degree and a position of the swirling flow and the stagnation occurring locally change due to a fact that the flow velocity changes, it is possible to clean the inner surface of the portion which is alienated from the swirling flow and the stagnation and thus is not cleaned by exposing the inner surface thereof to a shearing flow. Further, the dirt component staying in the swirling flow and the stagnation can be carried on the main flow and cleaned away, thereby making it possible to obtain the cleaning effect with respect to each portion of FIG. 3.

Hereinafter, with respect to the cleaning effect improvement on the wall surface of the nozzle and the cleaning power improvement of the throttle, the curvature, the connecting part, and the like of the nozzle during the cleaning time, an example of a method of achieving an effect of increasing the cleaning power to a specific portion by the flow velocity change of the cleaning water in the nozzle will be described. In this example, the syringe used for the aspiration and the discharge at the time of dispensing is used as a flow velocity control mechanism, however, since the flow velocity in the flow path can be changed by being provided with the opening time of the solenoid valve; the control of the opening amount; a method in which the throttle is disposed in the flow path and an actuator for varying a degree of the throttle is provided; a mechanism for bending the flow path itself; and a pinching mechanism, the same effect as that in the case of using the syringe can be obtained.

Figure 5:
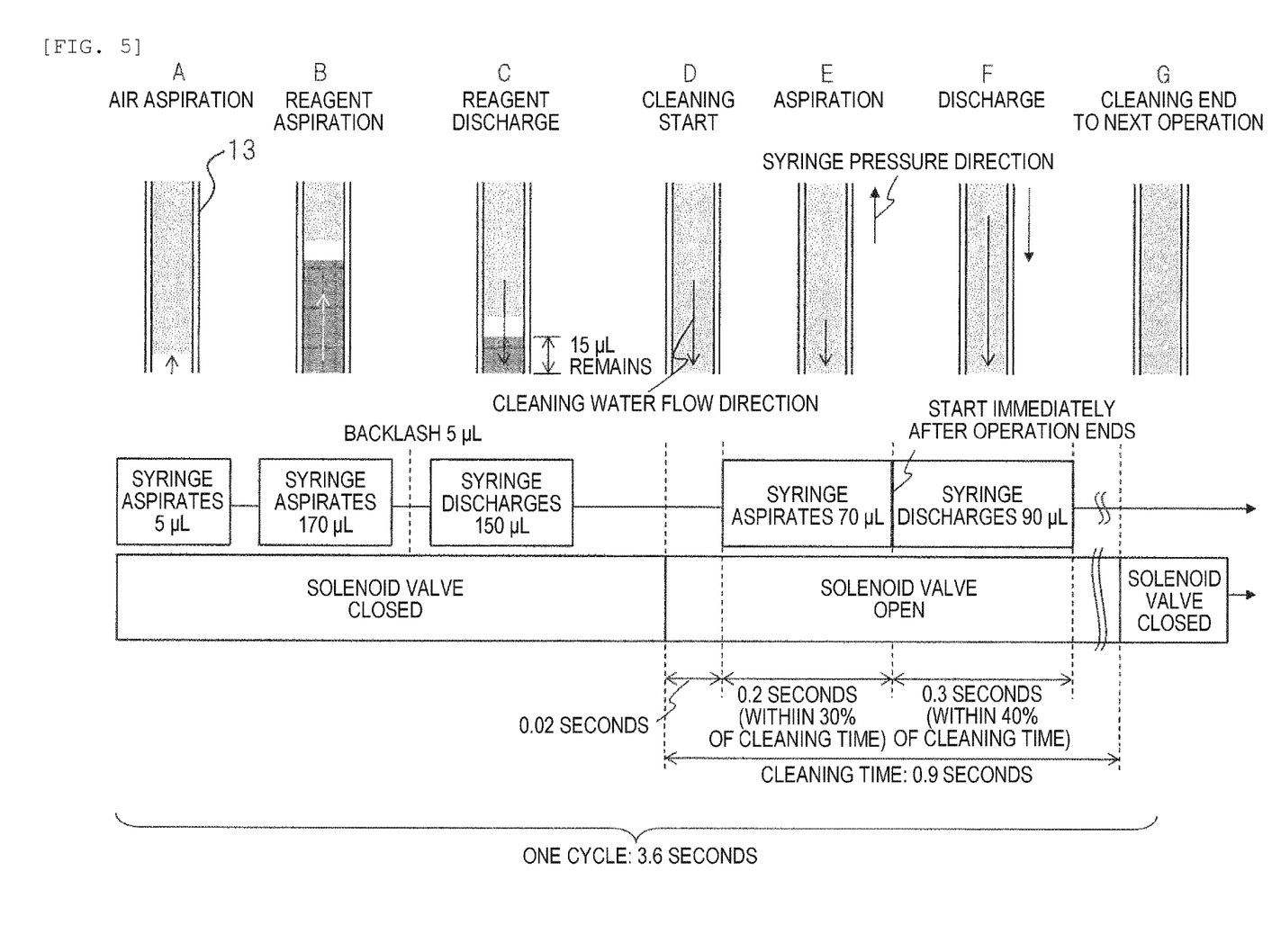
FIG. 5 is a schematic diagram of a series of cycles of reagent dispensing.

FIG. 5 illustrates a series of flows during the reagent dispensing operation in the embodiment. Even with respect to the sample dispensing, a nozzle diameter, a motor, and syringe resolution are only different, and a concept of a basic operation is the same. Even though a dispensing cycle is unique to the device, but the present invention can be applied to a device having any cycles. In the present invention, the automatic analyzer in which the dispensing cycle of the reagent probe is formed to 3.6 seconds will be descried as an example. The reagent nozzle has a shape as illustrated in FIG. 3, and there exist the throttle, the curvature, and the connecting part at the tip portion. A diameter from the throttle to the tip is set to be, for example, 0.8 mm in diameter, and a diameter from the throttle in a pump direction is 1.1 mm. A length from the tip of the nozzle to the curved part is 160 mm, and the curved part is R15 mm and is curved in an approximately right-angle direction. The maximum aspirating possible amount in the cycle of the reagent nozzle is 200 μL.

For example, an application example of the present invention will be described with respect to an operation when the device aspirates 150 μL of the reagent. In the dispensing cycle, even though the cleaning time depends on scheduling of the whole cycle, but generally more than 20% of the whole time is applied to the cleaning time. When the whole time is 3.6 seconds, the cleaning time becomes 0.72 seconds or more. For example, the time used for the cleaning becomes 0.9 seconds. When an example of the dispensing operation by the nozzle is described with reference to FIG. 5, the dispensing operation is performed in the following flow. First, at the time of aspirating the reagent, an air aspirating operation of 5 μL is performed to prevent dilution of the reagent (A of FIG. 5). Thereafter, the nozzle descends to an aspirating position, and then the aspirating operation is performed by the syringe. At this time, in addition to 150 μL for discharge, an additional 20 μL of the reagent is aspirated to prevent the dilution of the inside of the nozzle (B of FIG. 5). Immediately after this operation, for example, the discharging operation for 5 μL is performed as a backlash eliminating operation. Next, the nozzle moves to a reagent discharging position and the syringe is pushed up by 150 μL, thereby discharging the reagent (C of FIG. 5). In the nozzle after the discharging operation, 15 μL of the reagent after deducting the amount of reagent aspirated additionally at the time of aspiration and the backlash eliminating operation remains.

Next, after the nozzle moves to a cleaning position, the solenoid valve is opened, thereby discharging the cleaning water (D of FIG. 5). Thereafter, here, after the lapse of 0.02 seconds, the syringe is operated in the aspirating direction while the solenoid valve is opened, and the flow velocity of the cleaning water changes in a decelerating direction (E of FIG. 5). In order not to draw the reagent in the nozzle and since it is effective to perform the aspirating operation after the flow velocity is developed, a waiting time should be provided after the solenoid valve is opened before performing the aspirating operation E in FIG. 5. The waiting time is set according to the pressure of the liquid feeding pump and a length of the flow path from the liquid feeding pump to the tip of the nozzle. Alternatively, a system in which the device determines that the pressure in the nozzle becomes constant by using a pressure sensor, and the like may be used. Except a case where the flow path is remarkably long, when the length of the flow path is about 5 m, the waiting time of about 0.02 to 0.1 second at the liquid feeding pump pressure of about 300 KPa is enough.

In E of FIG. 5, the solenoid valve is in an open state, and since the pressure is applied to a nozzle tip direction, a syringe aspirating operation is required to be performed at an operation amount and time to some extent of changing the flow velocity against the pressure. Specifically, the effect can be remarkably obtained by the syringe operation of aspirating 30% or more of an upper limit value of the device aspirating amount in the time within 30% of the whole cleaning time. That is, it is desirable that the time during which the flow velocity is decelerated is within 30% of the whole cleaning time. Further, it is desirable that an aspirating operation amount is as large as possible. In this example, when 0.9 seconds is the time used for the whole cleaning, the syringe performs the operation of aspirating 60 μL or more which is 30% of 200 μL in the time within 0.3 seconds as the maximum aspirating possible amount. For example, when the cleaning time is set to 0.9 seconds in a 3.6 second cycle as an operation of satisfying the above-mentioned condition, the syringe aspirating operation of 70 μL is performed in 0.2 seconds in the 3.6 second cycle.

According to the aspirating operation, the flow velocity is momentarily decelerated, thereby making it possible to obtain a mechanism for improving the cleaning effect as illustrated in FIG. 2, and further, the cleaning effect is obtained against deviation of the flow as illustrated in A, B, C, and D of FIG. 4 by changing the flow velocity.

A condition of the reagent nozzle is described above, but as for the sample nozzle, since the diameter of the sample nozzle is smaller than that of the reagent nozzle, the effect can be obtained even in the case of 15% or more as the syringe aspirating amount under the same time condition as that of the reagent dispensing mechanism. After the above-mentioned syringe aspirating operation, the discharging operation is performed (F of FIG. 5). Normally, this discharging operation is an operation of resetting the syringe to a home position for the next dispensing operation, however, the flow velocity lowered by the aspirating operation can be rapidly accelerated and the cleaning effect can be momentarily improved by pushing the operation back to the home position together with the above-described syringe aspirating amount at a high velocity immediately after the aspirating operation E in FIG. 5. It is desirable that the operation returns the syringe to the home position in time equal to or shorter than 40% of the whole cleaning time. For example, in the cleaning time of 0.9 seconds, the operation is performed by using 0.3 seconds which is less than 0.36 seconds which is 40% thereof. Further, at the home position, the plunger is in a state of being pushed out, but in a state where the reagent is discharged, the plunger is not in the state of being pushed out and a distance to some extent of the home position remains. In addition to increasing the cleaning effect by the effect of acceleration, the syringe can be returned to the home position by a series of flows of the cleaning operation by pushing out a distance larger than a retracting amount of the plunger (a volume larger than a volume corresponding to a retracting amount) to fill the distance in an accelerating process of the cleaning water immediately after decelerating the flow velocity of the cleaning water.

Figure 6:
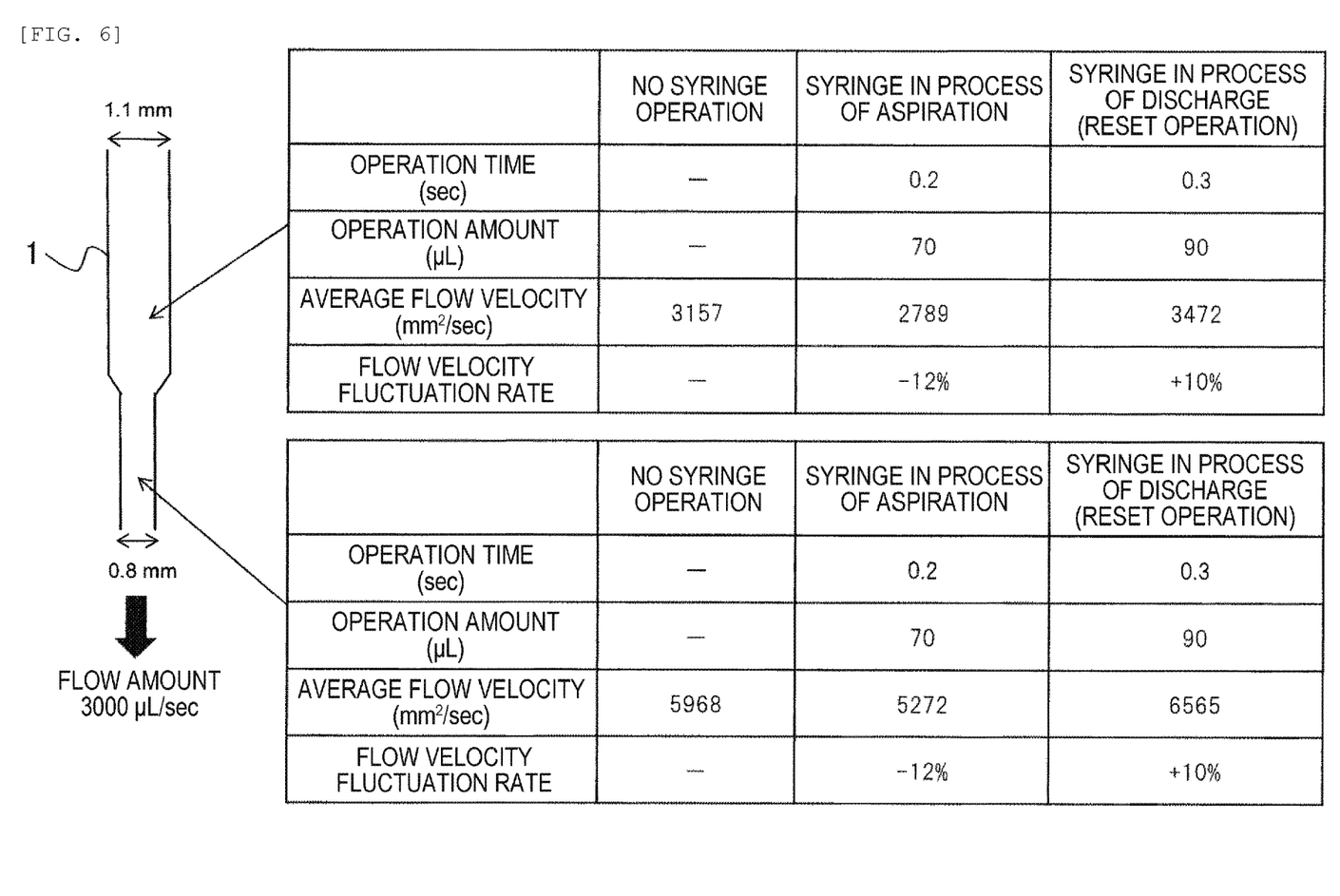
FIG. 6 is a diagram illustrating an example of a change in a cleaning water flow velocity due to a syringe operation of the present invention.

With respect to a flow velocity change in the syringe aspirating and discharging operation, when the amount of the cleaning water discharged from the tip of the nozzle at the cleaning time of 0.9 seconds is 3,000 μL/sec, the flow velocity of the cleaning water in the nozzle has a relationship as illustrated in FIG. 6. Here, the flow velocity is an average flow velocity in syringe aspirating and discharging operation time. With respect to the syringe discharging operation F in FIG. 5, the discharging amount is 90 μL, however, when the syringe is operated as largely as possible within the same time period, the change in the flow velocity also increases. As a method of securing the operation amount in F of FIG. 5, after the reagent is discharged in C of FIG. 5, air aspiration is performed, and the aspirating amount can be added to the discharging operation F in FIG. 5. Further, the flow velocity change can be further largely increased in such a manner that after the operation F in FIG. 5, the syringe performs aspiration again and the operation moves to the next dispensing operation, such that the syringe aspirating amount after the previous cleaning is added to the operation of the operation amount in FIG. 5.

FIG. 6 illustrates a calculation of an average flow velocity value during the operation of each syringe when the cleaning is performed under the conditions of the syringe in FIG. 5. According to the embodiment, in a case where no syringe operation is set as a standard, when there exist flow velocity changes of a flow velocity fluctuation rate of −12% at the time of the syringe aspiration and a flow velocity fluctuation rate of +10% at the time of the syringe discharge, the cleaning effect can be obtained. In this way, it is desirable to control the syringe so that the sum of the absolute values of each of the flow velocity fluctuation rates becomes 20% or more. When this condition is applied, the carry-over amount decreases by about 50% in comparison with a case to which the present invention is not applied.

Figure 7:
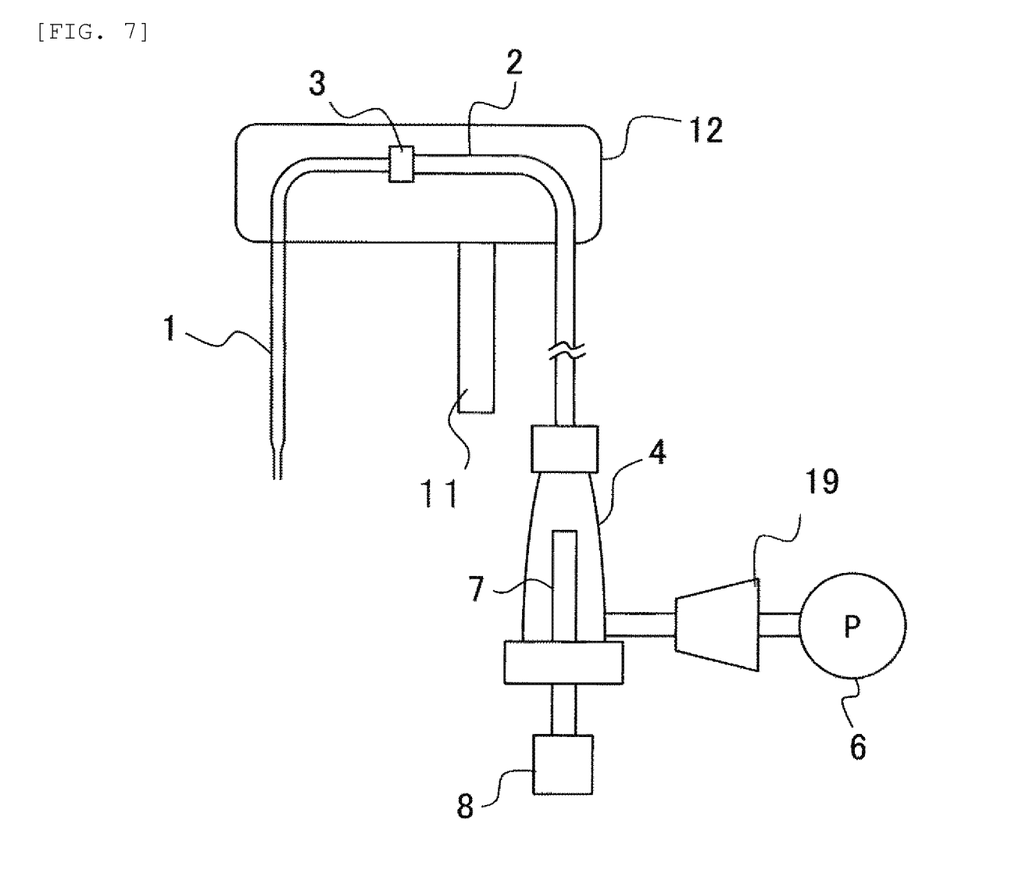
FIG. 7 is a schematic diagram of an embodiment of the present invention using an opening amount adjustable solenoid valve.
Figure 8:
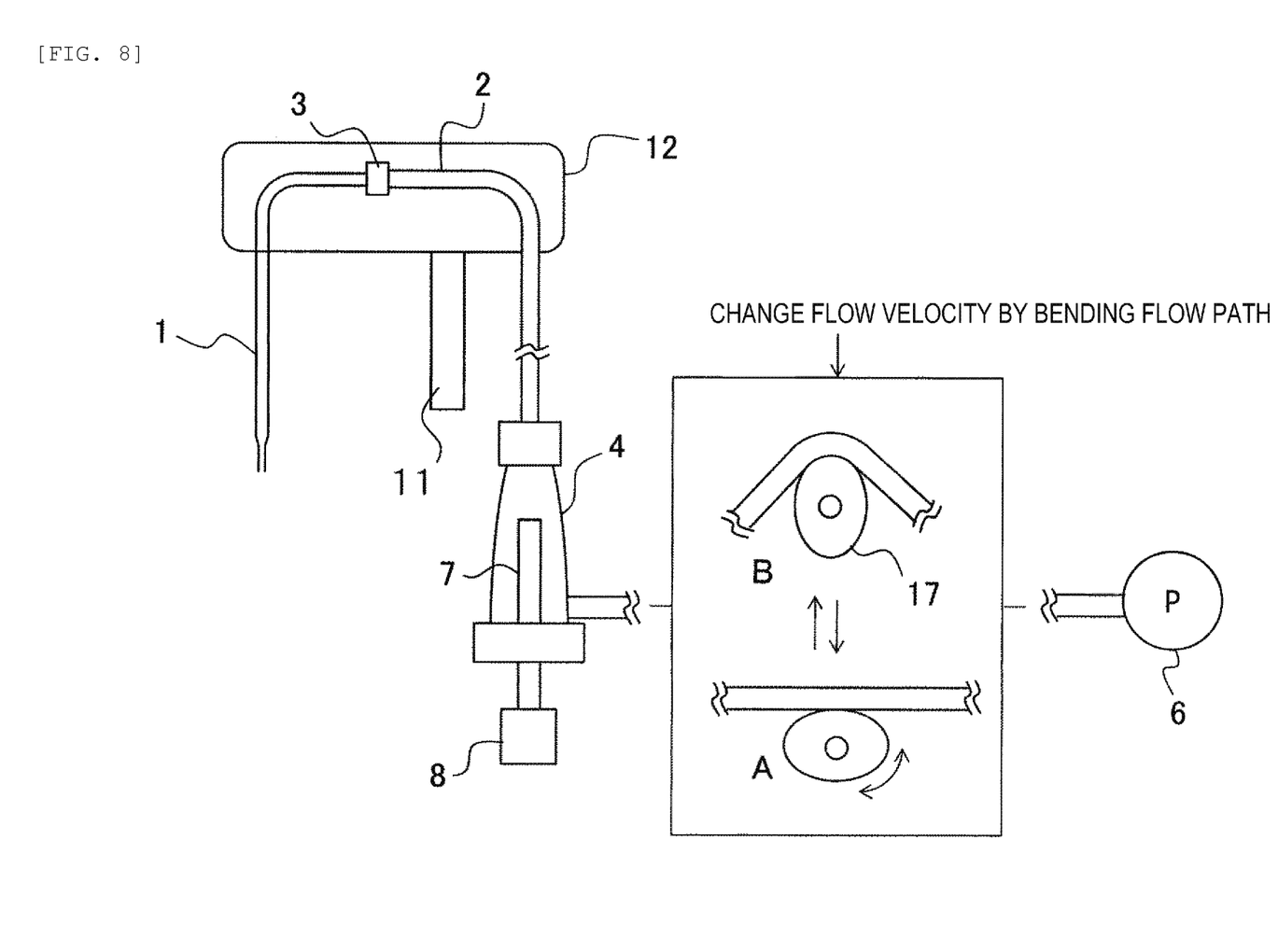
FIG. 8 is a schematic diagram of the embodiment of the present invention including a bending mechanism.
Figure 9:
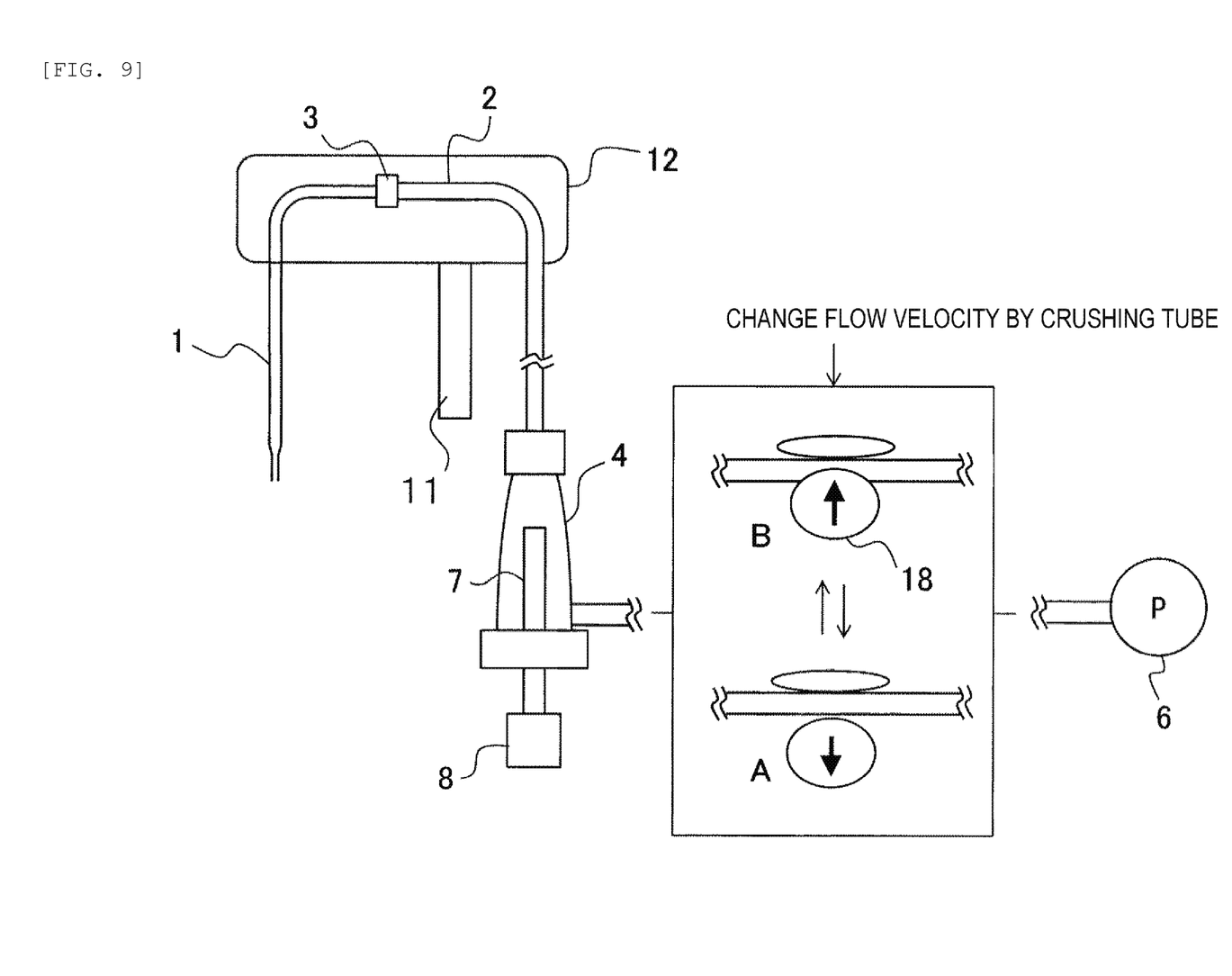
FIG. 9 is a schematic diagram of the embodiment of the present invention including a pinching mechanism.

The embodiment uses the syringe as a flow velocity control mechanism, however, the timing of the flow velocity change and the flow velocity change amount in FIGS. 5 and 6 may be realized by a method that uses an opening amount adjustable solenoid valve 16 as a pressure changing mechanism as illustrated in FIG. 7; and a method of providing a bending mechanism 17 of the flow path tube as illustrated in FIG. 8 and a pinching mechanism 18 of the tube as illustrated in FIG. 9 as the pressure changing mechanism, or a method of changing the flow amount by momentarily opening and closing the solenoid valve 5 at the time of the cleaning in the configuration of FIG. 1, and the like.

For example, the bending mechanism 17 in FIG. 8 is in a state A of FIG. 8 when starting the cleaning, and the flow path is bent as illustrated in a state B of FIG. 8 by the operation of the bending mechanism 17 to have resistance, whereby the flow velocity on the nozzle side is momentarily lowered. In the state B of FIG. 8, the swirling flow and the stagnation occur in a bent part, however, since the dirt does not reach this bent part, the dirt does not become a problem for the cleaning.

Referring to FIG. 9, the pinching mechanism 18 is in a state A of FIG. 9 when starting the cleaning, and when a state B of FIG. 9 is taken, the tube is crushed at a pinching part, thereby momentarily lowering the flow velocity. Even in the mechanism illustrated in FIG. 9, the swirling flow and the stagnation occur in the operation part as illustrated in FIG. 8, however, since the dirt does not reach the operation part, the dirt does not become a problem for the cleaning.

In the present invention, since the cleaning effect can be improved without inhibiting the dispensing cycle while maintaining the conventional liquid feeding pump pressure, it is particularly effective for the automatic analyzer having high processing capability.

Hereinabove, the examples are described. The examples described so far specifically describe the desirous examples, however, when the inside of the nozzle is being cleaned, at least the controller 41 decelerates the flow velocity of the cleaning water fed from the liquid feeding pump by controlling the pressure changing mechanism such as the syringe, and the like, whereby the effect of the present invention can be obtained.

Further, more desirably, the pressure changing mechanism is the syringe, and it is desirable that the controller decelerates the flow velocity of the cleaning water fed from the liquid feeding pump by performing the control to retract the plunger of the syringe. It is possible to use a syringe provided conventionally and to obtain the effect of the present invention without providing a new mechanism.

Further, it is desirable that the inside of the nozzle is cleaned within one cycle during the analysis. The reason is that the above-described cleaning thereof is a cleaning method suitable for the cleaning in a short time, and there is no requirement of lowering the throughput of the device for the cleaning. However, when the effective cleaning is required in a short time, the cleaning can be applied at the timing such as maintenance cleaning, and the like other than analysis.

Further, the controller 41 desirably decelerates the flow velocity of the cleaning water for the time equal to or shorter than 30% from the start of feeding the cleaning water from the liquid feeding pump until the completion thereof. The reason is that it is possible to obtain a high cleaning effect on a portion and a wall surface where the dirt is easy to remain locally and while suppressing deterioration in the cleaning effect caused by the decrease in the amount of the cleansing water due to the deceleration. For example, the start of feeding the cleaning water can be set based upon the opening of the solenoid valve and the completion thereof can be set based upon the closing of the solenoid valve.

Further, it is desirable that the controller 41 controls the pressure changing mechanism so that the average flow velocity during the period of decelerating the flow velocity of the cleaning water is reduced by 10% or more in comparison with a state where the pressure changing mechanism is not driven. The reason is that it is possible to effectively discharge the dirt accumulated in the swirling flow and the stagnation temporarily generated to the outside by setting the reduction amount to 10% or more, thereby improving the cleaning effect.

Further, the controller 41 desirably controls the pressure changing mechanism so that the control 41 accelerates the flow velocity by the pressure changing mechanism immediately after the flow velocity of the cleaning water is decelerated by the pressure changing mechanism and the sum of the absolute values of the fluctuation rates of the average flow velocity during the period of deceleration and acceleration by the pressure changing mechanism is 20% or more in comparison with the state where the pressure changing mechanism is not driven. The larger a deviation width of the fluctuation rate is, the higher the cleaning effect is.

Further, the pressure changing mechanism is the syringe, and it is desirable that the controller 41 performs the control to retract the plunger by a volume capable of aspirating 15% or more of an upper limit of an amount by which the nozzle can aspirate the liquid. The reason is that as the volume of the plunger which is retracted in a short time is large, a deceleration effect becomes higher, thereby contributing to the cleaning effect.

Further, it is desirable that the controller 41 accelerates the flow velocity of the cleaning water by pushing out a volume larger than the volume of retracting the plunger. In addition to improving the cleaning effect by an acceleration effect of the flow velocity, the syringe can be returned to the home position by a series of flows of the cleaning operation.

Further, the pressure changing mechanism is the opening amount adjustable solenoid valve capable of adjusting the opening amount from the liquid feeding pump to the nozzle, and the controller 41 can also decelerate the flow velocity of the cleaning water fed from the liquid feeding pump by adjusting the opening amount. In this case, the current flow velocity of the cleaning water can be decelerated without changing the conventional syringe operation. Further, a high cleaning effect can be obtained by a simple method such as replacing a conventional solenoid valve with the opening amount adjustable valve.

Further, the pressure changing mechanism is a mechanism for bending the flow path from the liquid feed pump to the nozzle, and the controller 41 can decelerate the flow velocity of the cleaning water fed from the liquid feeding pump by bending the flow path. The flow path resistance can be raised or lowered by performing the bending as illustrated in FIG. 8, thereby making it possible to decelerate the flow velocity.

Further, the pressure changing mechanism is a mechanism for pinching the flow path from the liquid feeding pump to the nozzle, and the controller 41 can reduce the flow velocity of the cleaning water fed from the liquid feeding pump by pinching the flow path. The flow path resistance can be raised or lowered by performing the pinching as illustrated in FIG. 9, thereby making it possible to decelerate the flow velocity.

Further, various conditions are described, but the conditions described so far can be appropriately combined with each other. Further, the cleaning water is described as an example of the cleaning liquid, but the same effect can be obtained by using a cleaning liquid such as a detergent, and the like.

REFERENCE SIGNS LIST

1: reagent dispensing nozzle
2: tube
3: connecting part
4: syringe
5: solenoid valve
6: liquid feeding pump
7: plunger
8: motor
9: reagent bottle
10: reaction container
11: nozzle cleaning mechanism
12: cover
13: nozzle wall surface
14: throttle
15: curved part
16: connecting part
17: bending mechanism
18: inching mechanism
19: opening amount adjustable solenoid valve

The invention claimed is:
1. An automatic analyzer, comprising:
a reagent nozzle dispensing a reagent into the reaction container;
a reaction disk including the reaction container;
a pump;
a syringe including a plunger driven by a motor;
a first pipe connecting the nozzle and the syringe, and a second pipe connecting the syringe and the pump;
a solenoid valve disposed on the second pipe between the pump and the syringe;
a cleaning liquid tank disposed upstream of the pump;
a controller which controls the motor, the solenoid valve and the pump,
wherein the controller is configured to:
in a cleaning cycle, control the solenoid valve to be in an open state thereby allowing cleaning liquid to flow through the nozzle, and
while maintaining the solenoid valve is in an open state during the cleaning cycle:
control the motor to drive the plunger to aspirate a predetermined amount and for a predetermined time, and after lapse of the predetermined time, control the motor to drive the plunger to discharge the cleaning liquid;
wherein the controller is configured to control the reagent nozzle to aspirate and discharge the reagent into the reaction container and complete the cleaning cycle within a first period of time and the cleaning cycle is at least twenty percent of the first period of time,
wherein the predetermined amount of time is within 30% of a time for the cleaning cycle, and
wherein the controller is configured to control the motor to drive the plunger to aspirate the predetermined amount so that an average flow velocity of a period during which a flow velocity of the cleaning liquid is decelerated is lowered by 10% or more in comparison with a state where the cleaning liquid flows through the nozzle with the solenoid valve open and the plunger is not driven by the motor.

* * * * *